Nov. 5, 1935.　　　W. A. MOORE　　　2,020,200
POWER GENERATING APPARATUS
Original Filed Aug. 16, 1933　2 Sheets—Sheet 1
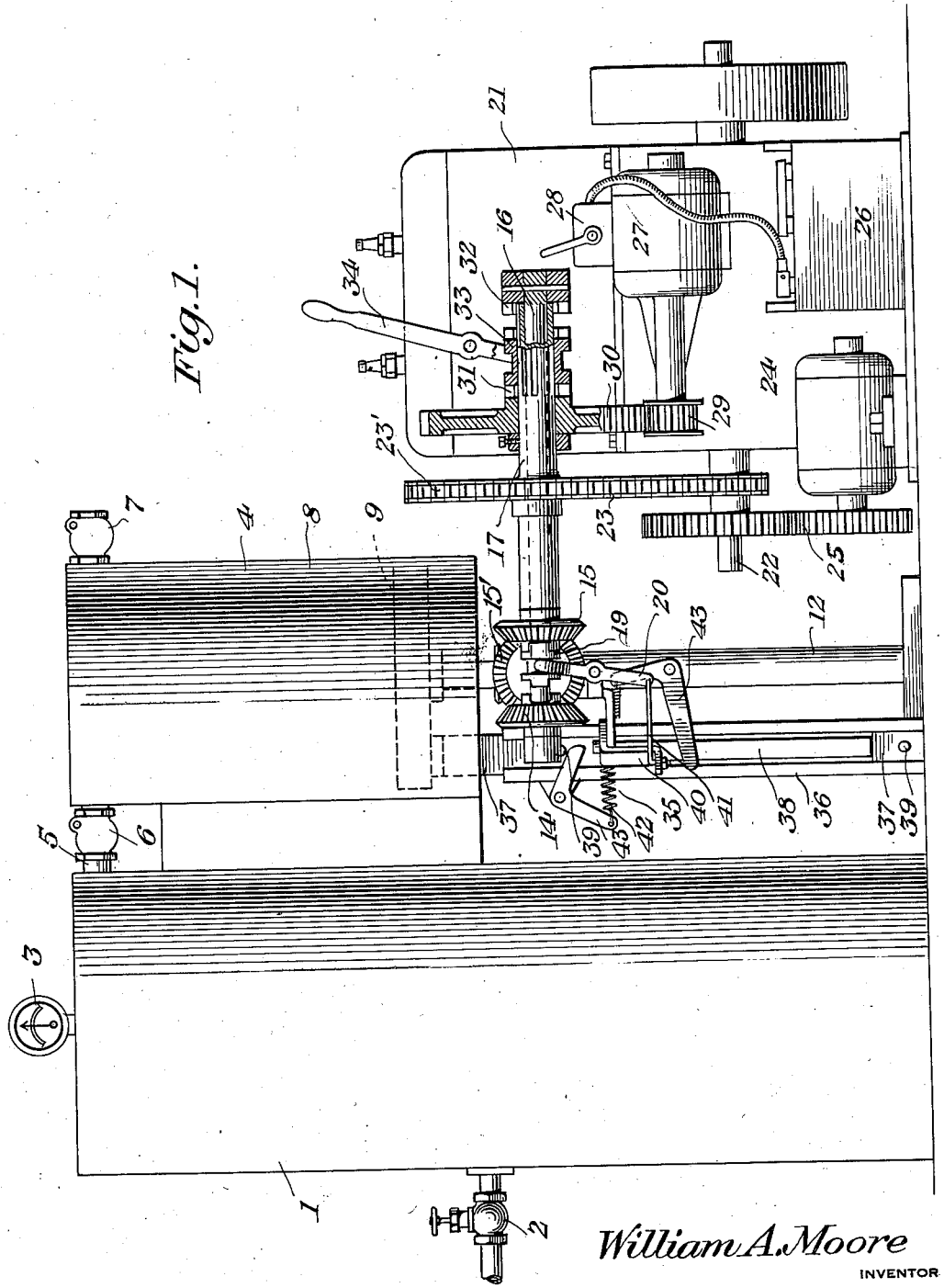
William A. Moore
INVENTOR
BY Victor J. Evans & Co.
ATTORNEYS Nov. 5, 1935.  W. A. MOORE  2,020,200
POWER GENERATING APPARATUS
Original Filed Aug. 16, 1933  2 Sheets-Sheet 2
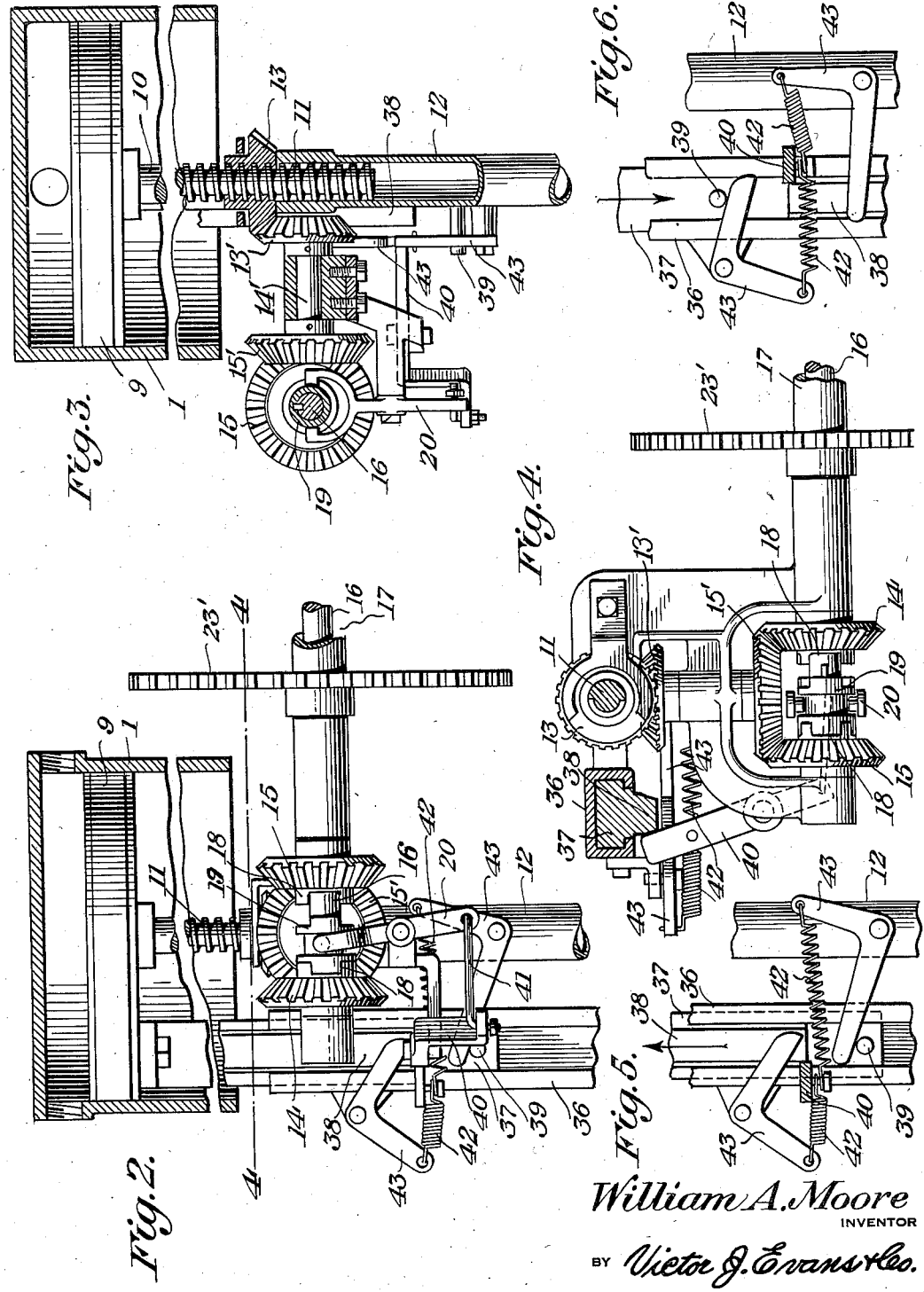
William A. Moore
INVENTOR
BY Victor J. Evans & Co.
ATTORNEYS Patented Nov. 5, 1935

2,020,200

UNITED STATES PATENT OFFICE 2,020,200

POWER GENERATING APPARATUS

William A. Moore, Lakota, Iowa

Application August 16, 1933, Serial No. 685,474
Renewed July 10, 1935

2 Claims. (Cl. 74—59)

This invention relates to a power generating apparatus and more particularly to a device for compressing air in a storage tank and has for the primary object the provision of an improved drive mechanism between the piston of a compressor and the power source whereby excessive pressure may be developed in the storage tank from a power source of small horse power.

Another object of this invention is the provision of means whereby a portion of the drive mechanism may be employed for connecting a starter to the power source when desiring to start the latter under its own power.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a side elevation partly in section illustrating a power generating apparatus constructed in accordance with my invention.

Figure 2 is a fragmentary vertical sectional view illustrating drive mechanism for the compressor.

Figure 3 is a fragmentary sectional view illustrating the worm drive for the piston of the compressor.

Figure 4 is a sectional view taken on the line 4—4 of Figure 2.

Figure 5 is a fragmentary side elevation, partly in section, illustrating one position of the trip mechanism for the control clutch of the drive mechanism.

Figure 6 is a similar view showing the other position of the trip mechanism.

Referring in detail to the drawings, the numeral 1 indicates a storage tank having a valve controlled outlet 2 and pressure gage 3. Located adjacent the tank 1 is a compressor 4 connected to the tank 1 by a pipe 5 having a check valve 6. An intake 7 is provided for the compressor and is equipped with a check valve. The compressor includes a cylinder 8 and a piston 9 reciprocally mounted in the cylinder and provided with a stem 10 having feed threads 11. The stem is slidably received by a tubular support 12 to which is journaled a gear 13 having feed threads meshing with the feed threads 11 of the stem. The gear 13 is in continuous mesh with a gear 13' secured to a rotatably supported stub shaft 14' and the latter has secured thereto a gear 15' which meshes with gears 14 and 15 and the latter are journaled on a power shaft 16 suitably supported and on which is journaled a sleeve 17. The gears 14 and 15 are provided with clutch faces 18 which faces oppose each other and are alternatingly engaged by a clutch element 19 splined to the power shaft 16 and is equipped with a pivotally mounted clutch lever 20. The gear 14 is adapted to drive the piston 9 in one direction while the gear 15 is adapted to drive said piston in an opposite direction. The gears 14 and 15 are alternatingly rotated by the power shaft by being alternatingly engaged by the clutch 19.

Located adjacent the compressor is an engine 21, the power take-off shaft 22 thereof connected to a sprocket gear 23' by a sprocket chain 23 and said sprocket gear 23' is secured to the sleeve 17. Mounted upon the base of the engine is an electric generator 24 driven from the power take-off shaft 22 by gears 25. The generator is employed for charging a battery 26 electrically connected to an electric starter 27 mounted to the engine 21. A control switch 28 is in the circuit between the starter and the battery whereby said circuit may be opened and closed as desired. The armature shaft of the starter is equipped with a pinion 29 meshing with a gear 30 journaled on the sleeve 17 and said gear 30 is provided with a clutch face 31. Secured to the shaft 16 and opposing the clutch face 31 is a clutch face 32. Splined to the sleeve 17 is a clutch 33 adapted to alternatingly engage the clutch faces 31 and 32 by the pivotal movement of a control lever 34.

To start the engine 21 under its own power, the clutch 33 is moved in engagement with the clutch face 31 and the switch 28 is closed and after the starting of the engine the switch 28 is opened and the clutch 33 disengaged from the clutch face 31 and moved into engagement with the clutch face 32 secured to the shaft establishing a drive between the power take-off shaft 22 and the power shaft 16.

An automatic trip mechanism 35 is provided for the clutch 19 and its operation is effected by the movement of the piston 9 in the cylinder 8 of the compressor 4. Secured to the piston 9 and slidable in a vertical guide 36 is a bar 37 having an elongated offset portion 38 projecting beyond the guide and equipped adjacent its ends with pins 39. A clutch control lever 40 is pivotally mounted adjacent the projection 38 of the bar 37 and one end of said lever is connected to the clutch lever 20 by a link 41 while the opposite end of the clutch control lever 40 is adapted to alternatingly engage opposite sides of the projection 38. Coil springs 42 are connected to the last-named end of the clutch control lever 40 and extend in opposite directions and are connected to trip levers 43 of the bell crank type which are pivotally supported. The bell crank levers 43 are arranged to lie in the path of movement of the pins 39. The piston 9 on arriving near to the end of its stroke in one direction will, through the bar 37 and one of the pins, rock one of the trip levers 43 tensioning its respective spring 42. The tensioning of said spring places a pull upon the clutch control lever 40 in one direction and as the offset 38 of the bar 37 passes said clutch control lever 40 the latter shifts its position to the opposite side of the offset. The movement of the control lever 40 actuates the clutch 19 to disengage one of the gears from the power shaft and engage the other gear with said power shaft, thereby driving or reversing the movement of the piston 9. When the piston 9 reaches the end of its stroke in this direction, the clutch 19 is shifted to engage the other gear of the power shaft by the other pin actuating the other trip lever 43 to place tension on the clutch control lever in an opposite direction so that it will shift its position when the offset 38 of the bar 37 passes said clutch control lever. It will be seen that the automatic trip mechanism 35 will reverse the movement of the piston 9 when the latter reaches the end of either its stroke and that the piston is reciprocated through a worm feed driven from the power shaft which provides a drive to the piston capable of maximum compression from a power source of minimum horse power.

While I have shown and described the preferred embodiment of my invention, it will be understood that minor changes in construction, combination and arrangement of parts may be made without departing from the spirit and scope of my invention, as claimed.

Having described the invention, I claim:

1. A drive mechanism for a power generating apparatus comprising a reciprocating piston of a compressor, a worm drive for actuating the piston, a power shaft, oppositely arranged gears journaled on the power shaft, means connecting said gears to the worm drive, a clutch for alternatingly connecting the gears with the power shaft, a bar secured to the piston, a guide slidably receiving said bar, an offset on said bar, a clutch control lever to alternatingly engage opposite sides of the offset in accordance with the movement of the bar, means connecting the lever to the clutch, and means for tensioning the clutch control lever after predetermined movements of the bar to cause said lever to shift its position from one side of the offset to the opposite side thereof for effecting movement of the clutch.

2. A drive mechanism for a power generating apparatus comprising a reciprocating piston of a compressor, a worm drive for actuating said piston, a power shaft, oppositely arranged gears journaled on the power shaft, means connecting said gears to the worm drive, a clutch for alternatingly connecting the gears with the power shaft, a bar secured to the piston, a guide slidably receiving said bar, an offset on said bar, a clutch control lever to alternatingly engage opposite sides of the offset in accordance with the movement of the bar, means connecting the lever to the clutch, spaced pins carried by the bar and located adjacent the ends of the offset, pivoted trip levers to be engaged by said pins, and coil springs between the trip levers and the clutch control lever.

WILLIAM A. MOORE.